United States Patent [19]

Töpfl

[11] 4,054,716
[45] Oct. 18, 1977

[54] PREPARATIONS OF REACTION PRODUCTS OBTAINED FROM EPOXIDES, FATTY AMINES AND REACTION PRODUCTS WHICH CONTAIN CARBOXYL GROUPS, PROCESS FOR THEIR MANUFACTURE AND THEIR USE

[75] Inventor: Rosemarie Töpfl, Dornach, Switzerland

[73] Assignee: Ciba-Geigy Corporation, Ardsley, N.Y.

[21] Appl. No.: 680,639

[22] Filed: Apr. 27, 1976

[30] Foreign Application Priority Data

May 6, 1975 Switzerland .................. 5820/75

[51] Int. Cl.$^2$ .................. C08L 63/00; C08L 61/20
[52] U.S. Cl. .................. 428/413; 260/29.2 E; 260/29.2 EP; 260/29.4 R; 260/29.4 UA; 260/32.6 R; 260/33.2 EP; 260/33.4 EP; 260/33.6 EP; 260/33.8 EP; 260/834; 427/386; 427/389; 427/390 R; 428/473; 428/480
[58] Field of Search .......... 260/834, 29.2 EP, 29.4 R, 260/29.4 UA; 427/386; 428/413

[56] References Cited

U.S. PATENT DOCUMENTS

| | | | |
|---|---|---|---|
| 3,444,114 | 5/1969 | Downing | 260/21 |
| 3,649,575 | 3/1972 | Toepfl | 260/21 |
| 3,709,847 | 1/1973 | Toepfl | 260/18 PN |
| 3,951,891 | 4/1976 | Toepfl | 260/21 |
| 3,959,196 | 5/1976 | Kardol | 260/18 EP |

*Primary Examiner*—Paul Lieberman
*Attorney, Agent, or Firm*—Edward McC. Roberts; Karl F. Jorda; Michael W. Glynn

[57] ABSTRACT

Preparations of reaction products obtained from epoxides, fatty amines and reactions products which contain carboxyl groups are provided.

These preparations contain
1. reaction products of (a) an epoxide which contains in each molecule at least two epoxide groups, (b) a fatty amine containing 12 to 24 carbon atoms, (c) a reaction product which contains carboxyl groups and is obtained from a trihydric to hexahydric aliphatic alcohol, 1,2-propylene oxide, and an aliphatic or aromatic dicarboxylic acid or the anhydrides thereof, and, optionally, (d) a monomeric bifunctional compound which is different from (a) and (c), and
2. an aminoplast precondensate which contains alkyl ether groups and which is used in admixture with (1) or as reaction component for obtaining (1) or as mixture and reaction component.

The preparations are useful as dressing agents for leather or as textile improving and finishing agents.

27 Claims, No Drawings

PREPARATIONS OF REACTION PRODUCTS OBTAINED FROM EPOXIDES, FATTY AMINES AND REACTION PRODUCTS WHICH CONTAIN CARBOXYL GROUPS, PROCESS FOR THEIR MANUFACTURE AND THEIR USE

The present invention provides preparations of reaction products obtained from epoxides, fatty amines and reactions products which contain carboxyl groups, said preparations containing 1. reaction products of
   a. an epoxide which contains in each molecule at least two epoxide groups,
   b. a fatty amine containing 12 to 24 carbon atoms,
   c. a reaction product which contains carboxyl groups and is obtained from
      $c_1$. a trihydric to hexahydric aliphatic alcohol,
      $c_2$. 1,2-propylene oxide, and
      $c_3$. an aliphatic or aromatic dicarboxylic acid or the anhydrides thereof, and, optionally,
   d. a monomeric bifunctional compound which is different from (a) and (c), and
2. an aminoplast precondensate which contains alkyl ether groups and which is used in admixture with (1) or as reaction component for obtaining (1) or as mixture and reaction component.

These preparations can be in the form, for example, of solutions in organic solvents, of dispersions, or, in particular, of emulsions.

The invention also has for its objects a process for the manufacture of the preparations, the reaction products obtained from the stated components, the product mixtures, and the use of the preparations or the reaction products contained therein, for example as dressing agents for leather or as textile improving and finishing agents.

Preparations consisting of reaction products of epoxides, fatty amines, dicarboxylic acids containing at least 7 carbon atoms, and, optionally, aminoplast precondensates, aliphatic diols, polyfunctional compounds and ammonia or water-soluble organic bases, are known from French Pat. No. 2,094,143. These preparations are used in particular for imparting a shrink-resistant finish to wool, for example in the form of yarns or fabrics.

French Pat. No. 2,246,580 describes further preparations consisting of reaction products based on epoxides and fatty amines. However, here the further reactants are dimerised or trimerised fatty acids and optionally anhydrides of mono- or dicarboxylic acids, as well as aliphatic saturated dicarboxylic acids, difunctional compounds and aminoplast precondensates. These preparations are used as binders and as dressing agents for leather.

Compared with the known reaction products, those of the present invention have a different chemical composition. Good results can also be obtained with them in the field of textile improving and finishing and in the dressing of leather.

The epoxides of component (a), which contain at least two epoxide groups in each molecule, are preferably derived from polyhydric phenols or polyphenols, such as resorcinol, phenol/formaldehyde condensation products of the resol or novolak type. Particularly preferred starting compounds for obtaining the epoxides are bisphenols, such as bis-(4-hydroxyphenyl)-methane and, above all, 2,2-bis-(4'-hydroxyphenyl)-propane.

Compounds to be mentioned particularly are epoxides of 2,2-bis(4'-hydroxyphenyl)-propane which have an epoxide content of 1 to 6 epoxy group equivalents/kg, but preferably 1 to 2 epoxy group equivalents/kg, and which have the formula

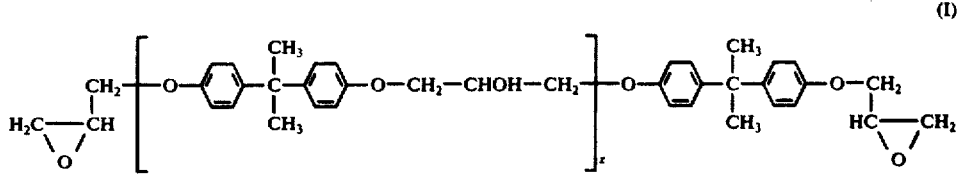

(I)

wherein z represents a mean number from 0 to 6, preferably from 0 to 2.2. Such epoxides are obtained by reacting epichlorohydrin with 2,2-bis-(4'-hydroxyphenyl)-propane.

Mono-fatty amines with 12 to 24 carbon atoms have proved principally to be very suitable components (b). Usually these are amines of the formula $$H_3C-(CH_2)_x-NH_2 \qquad (2)$$

wherein x represents an integer from 11 to 23, preferably from 17 to 21. The amines are therefore, for example, laurylamine, myristylamine, palmitylamine, stearylamine, arachidylamine or behenylamine. Mixtures of these amines, such as those obtainable in the form of commercial products, can also be used.

Trihydric to hexahydric aliphatic alcohols can also be used as component ($c_1$) for obtaining the reaction products of component (c) which contain carboxyl groups.

As examples there may be mentioned glycerol, trimethylolethane and trimethylolpropane, hexane-1,2,5-triol and hexane-1,2,6-triol, 3-hydroxymethylpentane-2,4-diol, pentaerythritol, dipentaerythritol, mannitol or sorbitol. Preferred alcohols as component ($c_1$) are trihydric to hexahydric aliphatic alcohols containing 3 to 6 carbon atoms, in particular glycerol, pentaerythritol, sorbitol, trimethylolethane and trimethylolpropane.

Component ($c_2$) is 1,2-propylene oxide.

Suitable compounds which can be used as component ($c_3$) are, for example, aliphatic saturated dicarboxylic acids containing 2 to 14 carbon atoms or the anhydrides thereof.

Such dicarboxylic acids can be those which contain at least 2 to 14 carbon atoms, and which have for example the formula $$HOOC-(CH_2)_{y-1}-COOH \qquad (3)$$

wherein y is an integer from 1 to 13, preferably 5 to 13. Particularly suitable dicarboxylic acids are those of the formula (3), wherein y is an integer from 3 to 9.

Examples of suitable saturated dicarboxylic acids are, accordingly, oxalic, malonic, succinic, glutaric, adipic, pimelic, suberic, azelaic or sebacic acid, and nonanedicarboxylic acid, decanedicarboxylic acid, undecanedicarboxylic acid or dodecanedicarboxylic acid.

Ethylenically unsaturated dicarboxylic acids and the anhydrides thereof containing 4 to 10 carbon atoms can also be used as component ($c_3$) and are, for example, maleic, fumaric, itaconic, citraconic or methylenemalonic acid. The preferred anhydride of these unsaturated acids is the anhydride of maleic acid.

The aromatic dicarboxylic acids of component ($c_3$) can be, for example, monocyclic or bicyclic aromatic dicarboxylic acids containing 8 to 12 carbon atoms, such as phthalic, isophthalic or terephthalic acid, substituted, in particular alkyl-substituted, phthalic acids, and can also be naphthalene-dicarboxylic acids.

Particularly suitable anhydrides of these acids are those derived from monocyclic or bicyclic aromatic dicarboxylic acids containing 8 to 12 carbon atoms. In this connection, anhydrides of monocyclic aromatic dicarboxylic acids containing 8 to 10 carbon atoms have proved particularly advantageous. Phthalic anhydride which is unsubstituted or substituted by methyl is particularly preferred.

The manufacture of the reaction products of component (c) can be carried out by known methods, wherein 1,2-propylene oxide is added to the trihydric to hexahydric alcohol ($c_1$) in a first step and subsequently reacted with an aliphatic or aromatic dicarboxylic acid or the anhydrides thereof ($c_3$).

The ratios of the individual components can be approximately 1 mole of ($c_1$), 2 to 110 moles of ($c_2$) and 2 to 6, preferably 3 to 5, moles of ($c_3$). The molecular weights can be about 200 to 6000.

The acid number of component (c) can be approximately between 40 and 400, preferably between 50 and 300.

The reaction products (c) can be obtained, for example, from the following components:

1.

1 mole of glycerol,
3 to 54 moles of propylene oxide,
3 moles of maleic anhydride,

2.

2 moles of glycerol,
4 to 6 moles of propylene oxide,
6 moles of maleic anhydride,

3.

1 mole of glycerol,
3 to 10 moles of propylene oxide,
3 moles of maleic anhydride

4.

1 to 2 moles of pentaerythritol,
4 to 24 moles of propylene oxide,
3 to 7 moles of maleic anhydride,

5.

1 mole of pentaerythritol,
4 to 12 moles of propylene oxide,
2 moles of maleic anhydride,

6.

1 mole of pentaerythritol,
4 to 16 moles of propylene oxide,
4 moles of maleic anhydride,

7.

1 mole of sorbitol,
9 to 10 moles of propylene oxide,
3 to 6 moles of maleic anhydride,

8.

1 mole of glycerol,
5 moles of propylene oxide,
3 mole of phthalic anhydride,

9.

1 mole of glycerol,
54 moles of propylene oxide,
3 moles of phthalic anhydride,

10.

1 mole of pentaerythritol,
4 moles of propylene oxide,
4 moles of sebacic acid.

Depending on their composition, the reaction products (c) are solid to liquid, highly viscous products. They can also be in the form of waxes, pastes, or also of oils, and are generally colourless or at most yellowish to brownish in colour.

As functional groups or atoms, the optional monomeric bifunctional component (d) can preferably contain halogen atoms which are attached to an alkyl radical, vinyl groups or carboxylic acid ester groups or at most one epoxide, carboxyl or hyddroxyl group together with a halogen atom which is attached to an alkyl radical, a vinyl group or a carboxylic acid ester group.

In particular, these compounds are bifunctional organic compounds which contain, as functional groups or atoms, alkyl-bonded chlorine or bromine atoms, vinyl groups or carboxylic acid alkyl ester groups or at most one epoxide or carboxyl group together with a chlorine or bromine atom which is attached to an alkyl radical, a vinyl group, or a carboxylic acid alkyl ester group.

Particularly suitable bifunctional organic compounds are, for example, epihalohydrins, such as epibromohydrin or, above all, epichlorohydrin, and also glycerol dichlorohydrin, acrylic acid, methylolacrylic amide, butylacrylate, and, in particular, acrylonitrile.

The aminoplast precondensates used as component (2) can be partially or completely etherified methylol compounds of nitrogen-containing aminoplast formers, such as urea, thiourea, urea derivatives, e.g. ethylene urea, propylene urea or glyoxalmonourein. Component (2) can at the same time also be present as mixture component or solely as mixture component in the preparations of this invention.

Preferably, however, etherified methylolaminotriazines are used, for example alkyl ethers of highly methylolated melamine the alkyl radicals of which contain 1 to 6, preferably 3 to 6, carbon atoms. Possible alkyl radicals include methyl, ethyl, n-propyl, isopropyl, n-butyl and n-hexyl radicals. In addition to such alkyl radicals, yet further radicals, for example polyglycol radicals, can also be present in the molecule. Furthermore, n-butyl ethers of a highly methylolated melamine containing 2 to 3 n-butyl groups in the molecule are preferred. By highly methylolated melamines are meant in this context those with an average of at least 5, preferably about 5.5, methylol groups. Preferably water-insoluble etherified methylolaminotriazines are used.

The manufacture of the reaction products can be carried out by methods which are known per se, wherein the components are reacted with one another in varying sequence. Advantageously, components (a) and (b) or (a), (b) and (c) are first reacted with one another. The reaction of component (c) with the already reacted components (a) and (b) can also be effected simultaneously, if appropriate, with the component (d) and/or with component (2). Component (c) is obtained from components $(c_1)$, $(c_2)$ and $(c_3)$ in a separate reaction.

On the one hand, it is therefore possible to react the components (a), (b) and (c) initially with one another simultaneously, and subsequently, if appropriate, to react the product with the component (d) and then with component (2). In this modification of the process, the components (a), (b) and (c) are advantageously reacted with one another at temperatures of 80° to 120° C, preferably at 100° C, the proportions being generally so chosen that for one epoxide group equivalent there are used 0.1 to 0.7 amino group equivalent of component (b), 0.2 to 1.5 acid equivalents of component (c), 0.1 to 0.7 mole of component (d) and 5 to 70, preferably 10 to 60, percent by weight of component (2), referred to the total weight of components (a) to (d) and (2). If component (2) is used as mixture component, it can also be used in amounts of about 5 to 70, preferably 10 to 60, percent by weight, referred to the total weight of components (a) to (d) and (2). The amount of component (1) is correspondingly 95 to 30, preferably 90 to 40, percent by weight. The use of the component (2) as mixture component without its simultaneous use as reaction component for the manufacture of the reaction products is preferred.

On the other hand, it is also possible to react initially the components (a) and (b) alone with each other and then with component (d) or (2). The manufacture of the reaction products obtained from (a) and (b) in this second modification is also advantageously carried out at temperatures of 80° to 120° C, preferably at about 100° C. The reaction in the second step with component (c) is carried out advantageously at 80° to 110° C, preferably at about 100° C.

The reaction with components (d) and (2) is carried out normally at a temperature of 60° to 100° C, preferably at about 100° C.

The reaction products that are obtained without using component (2) as reaction component can have as a rule an acid number of 5 to 100, preferably 10 to 60.

Suitable organic solvents in the presence of which the reaction products are manufactured are primarily watersoluble organic solvents and advantageously those that are infinitely miscible with water. Dioxan, isopropanol, ethanol, ethylene glycol-n-butyl ether (= n-butyl glycol), diethylene glycol monobutyl ether and dimethyl formamide may be cited as examples.

Moreover, it is also possible to carry out the reaction in the presence of water-insoluble solvents, e.g. in hydrocarbons like benzine, benzene, toluene, xylene; halogenated hydrocarbons, such as methylene bromide, carbon tetrachloride, ethylene chloride, ethylene bromide, s-tetrachloroethane, perchloroethylene, and trichloroethylene.

The preparations of the present invention contain reaction products (1) which can be manufactured using component (2), or they contain the reaction products (1) or the reaction products of (1) and (2) in admixture with component (2). At least one aminoplast precondensate should be used either as reaction component (2) for the manufacture of the reaction products or as mixture component.

The preparations can contain, for example, the following reaction products or mixtures: reaction products obtained from:

(a), (b), (c), (e), (2),
(a), (b), (c), (d), (e), (2),
(a), (b), (c), (2), or these reaction products in admixture with component (2), which optionally is then not to be used as reaction component.

The solids content in the preparations can be about 20 to 70 percent by weight.

The preparations of the reaction products can be used for different purposes, in particular as dressing agents for leather or as textile finishing agents, especially as coating agents, for natural or synthetic fibrous materials. They are applied as a rule from an aqueous medium in which the reaction products are present in emulsified form. To this end, the preparations of the reaction products are mixed with water and optionally with a wetting agent and dispersant. The resultant stable, aqueous emulsions can have a pH of about 3 to 8, preferably 4 to 6. The solids content can be about 10 to 40 percent by weight. Examples of suitable wetting agents and dispersants are adducts of an alkylene oxide, preferably ethylene oxide, and aliphatic or cycloaliphatic amines and alcohols of higher molecular weight, or fatty acids or fatty amides which optionally may be esterified at the hydroxy groups with polybasic or organic acids or, if they are nitrogen compounds, can also be quaternised. In addition, these compounds can also be reacted with further compounds in order to obtain, for example, a crosslinking effect.

Besides containing the emulsified reaction products or mixtures of the reaction products and the aminoplast precondensates, the application liquors can contain still other additives, for example acids or salts or also other finishing or improving agents. Phosphoric, sulphuric and hydrochloric acid or also oxalic, formic and acetic acid may be cited as examples of acids.

The amount of reaction product or mixture of reaction product and aminoplast precondensate (exclusive of solvent and water), based on the substrate, is desirably 1 to 10 $g/m^2$ for dressing leather and app. 10 to 50, preferably 10 to 30, percent by weight in the coating of textile materials or other substrates, and 1 to 10 percent by weight in textile improving (finishing), as additive in resin finishing or as binder for dyestuff or white pigments. The application is effected as a rule at 20° to 100° C, preferably at room temperature, and by known methods, for example by immersion, spraying, brushing, padding, impregnating or coating.

The leather to be finished can be of any desired provenance, but preferably so-called grained leather is used, i.e. leather that is to be dressed on the grain side. The leather finishing can be carried out in two steps by applying the preparations according to the invention for example together with a dye or pigment suitable for colouring leather, drying the treated leather, and then applying a colourless preparation that is able to impart for example an additional gloss to the coloured layer. The leather finished with these dressing agents has very good general fastness properties, in particular very good fastness to light, wet treatments and dry rubbing; it is also fast to ironing and creasing. The handle is also markedly improved. The dressed leather can therefore be termed as "easy-care". In the light of all its fastness properties, it is superior to leather that is dressed with polyurethanes or polyacrylates. In addition to the described effects an antimicrobial finish is imparted to the leather.

Textile materials which can be coated or improved (finished) are those made of cellulosic fibres, for example of cotton, ramie or jute, or regenerated cellulose, and also materials made from synthetic polyamide, polyacrylonitrile, polyvinylalcohol or polypropylene fibres. Mixtures of these fibrous materials, for example 67/33 or 50/50 polyester/cotton blends are also suitable. Other cellulosic materials which can also be coated are paper, cardboard and wood.

The cellulosic substrates, such as cotton textiles or paper, can be impregnated or coated in the conventional manner with the treatment solution or emulsion. The solvents can be water-soluble or water-insoluble. Aliphatic hydrocarbons, acetone, butyl acetate, ethylene glycols and ethylene glycol ethers are preferred. In the finishing, the fibrous material can be impregnated or padded with the treatment liquor and excess solution is subsequently squeezed out. During the impregnation, the temperature is preferably in the range from about 20° to 30° C. Paper can be treated by spraying the treatment emulsion or solution onto it. It is also possible to use other known methods of application. After the cellulosic material has been treated with the emulsion or solution it is preferably dried, advantageously in an oven at a temperature of about 20° to 180° C, depending on the boiling point of the solvent used and the speed of the goods. The temperatures are generally between about 80° and 150° C and temperatures of up to about 130° C are preferred.

After the cellulosic material has been impregnated and dried it is then cured. The curing of the substrates impregnated with the treatment solution or emulsion can be effected by heating, optionally in the presence of acid catalysts, at temperatures of about 80° to 180° C, preferably of 140° to 180° C. The customary acid or potentially acid compounds, such as phosphoric acid, ammonium chloride, magnesium chloride, zinc nitrate or zinc fluoroborate, can be used as curing catalysts.

The duration of the curing depends on the curing temperature and is in general from about 1 hour to 10 seconds. Curing times of 30 to 2 minutes are preferred. If the length of the curing time is of no great importance, the curing can also be carried out at room temperature, i.e. at about 20° C. Under these conditions the curing can take up to several days, for example 48 hours.

The coated textile material, especially that made from cotton or synthetic fibrous materials, has altogether excellent impermeability and it is impervious to air. Preferably the coating is used to obtain impermeable textile materials, for example for umbrella cloths, rainwear and tent materials. The finished material possesses good tear resistance and non-slip properties and also abrasion resistance, and it retains these effects even after numerous washes in hot wash liquors. In addition, the finish is resistant to dry cleaning and it imparts dimensional stability to the fabric.

In combination with aminoplasts or aminoplast precondensates the reaction products of the present invention are also suitable for finishing cellulosic or cellulose-containing textile materials, in particular for increasing their dimensional stability and for preventing deterioration of the mechanical properties (for example tear resistance and abrasion resistance) of the substrates. At the same time the soiling tendency of the treated substrates is reduced (antisoil effect) and an improved soil-release can also be observed. The new reaction products of the present invention are also suitable binders for those coloured and white pigments that can be used for example for colouring and printing cellulosic textile materials and, where appropriate, textile materials made from blended fabrics. The colourations and prints obtained are characterised by good fastness to washing and fastness to dry cleaning.

The parts and percentages in the following Examples are by weight.

MANUFACTURING DIRECTIONS

Reaction Products of Component (c) which Contain Carboxyl Groups

A. 400 g (1mole) of an adduct of propylene oxide and glycerol, 294 g (3 moles) of maleic anhydride and 2 g of N-benzyl-dimethylamine are stirred together for 4 hours at 120° C internal temperature. A highly viscous, clear product is obtained.

Acid number: 246

Viscosity:$\eta$ = 0.042. (The internal viscosities are measured at 25° C in acetone).

B. 400 g (1 mole) of an adduct of propylene oxide and pentaerythritol, 294 g (3 moles) of maleic anhydride and 2 g of N-benzyl-dimethylamine are stirred together for 1 hour and 40 minutes at 120° C internal temperature. A highly viscous, clear product is obtained.

Acid number: 248

Viscosity:$\eta$ = 0.036.

C. 140 g (0.2 mole) of an adduct of propylene oxide and sorbitol, 98 g (1 mole) of maleic anhydride and 1 g of N-benzyl-dimethylamine are stirred together for 2 hours at 120° C internal temperature. A highly viscous, clear product is obtained.

Acid number: 185

Viscosity:$\eta$ = 0.043.

D. 140 g (0.2 mole) of an adduct of propylene oxide and sorbitol, 58.8 g (0.6 mole) of maleic anhydride and 1 g of N-benzyl-dimethylamine are stirred for 2 hours at 120° C internal temperature. A highly viscous, clear product is obtained.

Acid number: 165

Viscosity:$\eta$ = 0.033.

E. 125 g (0.05 mole) of an adduct of propylene oxide and trimethylolpropane, 14.7 g (0.15 mole) of maleic anhydride and 1 g of N-benzyl-dimethylamine are stirred together for 3 hours at 120° C internal temperature. A viscous, clear product is obtained.

Acid number: 63

Viscosity:$\eta$ = 0.06.

F. 100 g (0.25 mole) of an adduct of propylene oxide and pentaerythritol, 202 g (1mole) of sebacic acid, 0.5 g of p-toluenesulphonic acid and 300 g of xylene are refluxed together. Using a water separator 17.5 ml of water are removed. The xylene is distilled off and a wax-like substance is obtained.

Acid number: 202

Viscosity:$\eta$ = 0.284.

G. 100 g (0.25 mole) of an adduct of propylene oxide and glycerol, 151.5 g (0.75 mole) of sebacic acid, 0.5 g of p-toluenesulphonic acid and 350 g of xylene are refluxed together. 13 ml of water are removed and the xylene is distilled off. A wax-like substance is obtained.

Acid number: 183

Viscosity: $\eta = 0.073$.

H. 200 g (0.5 mole) of an adduct of propylene oxide and glycerol, 222 g (1.5 moles) of phthalic anhydride and 2 g of N-benzyl-dimethylamine are stirred together for 6 hours, at 120° C internal temperature. A highly viscous, clear product is obtained.

Acid number: 220
Viscosity: $\eta = 0.032$.

I. 155 g (0.05 mole) of an adduct of propylene oxide and glycerol, 22.2 g (0.15 mole) of phthalic anhydride and 1 g of N-benzyldimethylamine are stirred together for 2 hours at 120° C internal temperature. A highly viscose, clear product is obtained.

Acid number: 53
Viscosity: $\eta = 0.066$.

K. 155 g (0.05 mole) of an adduct of propylene oxide and glycerol, 14.7 g (0.15) of maleic anhydride and 1 g of N-benzyl-dimethylamine are stirred together for 2 hours at 120° C internal temperature. A highly viscose, clear product is obtained.

Acid number: 52.2
Viscosity: $\eta = 0.075$.

L. 100 g (0.25 mole) of an adduct of propylene oxide and glycerol, 109.5 g (0.75 mole) of adipic acid and 0.5 g of p-toluenesulphonic acid are refluxed together in 300 g of xylene. Using a steam trap, 13.5 ml of water are removed. The xylene is distilled off and a wax-like substance is obtained.

Acid number: 220
Viscosity: $\eta = 0.085$.

M. 100 g (0.25 mole) of an adduct of propylene oxide and glycerol, 172.5 g (0.75 mole) of dodecanedicarboxylic acid, 0.5 g of p-toluenesulphonic acid and 300 g of xylene are refluxed together and 6.5 ml of water are removed with the aid of a steam trap. The xylene is distilled off and a wax-like substance is obtained.

Acid number: 183
Viscosity: $\eta = 0.07$

N. 200 g (0.5 mole) of an adduct of propylene oxide and glycerol, 150 g (1.5 mole) of succinic anhydride and 2 g of N-benzyldimethylamine are stirred together for 10 hours at 120° C internal temperature. A highly viscous, clear product is obtained.

Acid number: 256
Viscosity: $\eta = 0.043$.

EXAMPLE 1

98.5 g (0.1 epoxide group equivalent) of an epoxide formed from 2,2-bis-(4'-hydroxyphenyl)-propane and epichlorohydrin, 10.8 g (0.04 amino group equivalent) of stearylamine and 50 g of butyl glycol are stirred together for 2 hours at 100° C internal temperature. Then 11.4 g (0.05 acid equivalent) of the product described in Manufacturing Direction A are added and stirring is continued for 3 hours at 100° C internal temperature. Subsequently 2.2 g (0.04 mole) of acrylonitrile are added and stirring is continued for 1 hour at 100° C internal temperature. The reaction product is then diluted with 72.9 g of perchloroethylene to give a 50% clear resin solution.

Acid number: 21.6
Specific viscosity: 137600 cP at 20° C.

a. 90 g of this resin solution is emulsified together with 7.2 g of a 70% solution of hexamethylolmelamine dibutyl and tributyl ether in butanol and 20 g of a 50% aqeuous solution of an adduct of hydroabietyl alcohol and 200 moles of ethylene oxide which is crosslinked with 1% of hexamethylene-1,6-diisocyanate, with the addition of 49.3 g of deionised water that contains 0.5 of diammonium phosphate. A finely disperse emulsion is obtained.

Resin content: 30%, pH: 5.0.

b. 210 g of this resin solution are emulsified together with 13 g of a 90% solution of trimethylolmelamine dibutyl ether in butanol and 40 g of a b 50% aqueous solution of an adduct of hydroabietyl alcohol and 200 moles of ethylene oxide which has been crosslinked with 1% of hexamethylene diisocyanate, with the addition of 126 g of deionised water. A finely disperse emulsion is obtained.

Resin content: 30%, pH: 3.5.

EXAMPLE 2

98.5 g (0.1 epoxide group equivalent) of an epoxide according to Example 1, 10.8 g (0.04 amino group equivalent) of stearylamine and 50 g of butyl glycol are stirred for 2 hours at 100° C internal temperature. Then 11.3 g (0.05 acid equivalent) of the product described in Manufacturing Direction B are added and stirring is continued for 3 hours at 100° C internal temperature. Then 2.2 g (0.04 mole) of acrylonitrile are added and stirring is continued for 1 hour at 100° C internal temperature. The batch is subsequently diluted with 72.8 g of perchloroethylene and a 50% clear resin solution is obtained.

Acid number: 19

180 g of this resin solution are emulsified together with 14.4 g of a 70% solution of hexamethylolmelamine dibutyl and tributyl ether in butanol and 40 g of a 50% aqueous solution of an adduct of hydroabietyl alcohol and 200 moles of ethylene oxide which has been crosslinked with 1% of hexamethylene-1,6-diisocyanate, with the addition of 98.6 g of deionised water. A finely disperse emulsion is obtained.

Resin content: 30%, pH: 3.0.

EXAMPLE 3

98.5 g (0.1 epoxide group equivalent) of an epoxide according to Example 1, 10.8 g (0.04 amino group equivalent) of stearylamine and 50 g of butyl glycol are stirred for 2 hours at 100° C internal temperature. Then 15.7 g (0.05 acid equivalent) of the product described in Manufacturing Direction C are added and stirring is continued for 3 hours at 100° C internal temperature. Then 2.2 g (0.04 mole) of acrylonitrile are added and stirring is continued for 1 hour at 100° C internal temperature. The batch is subsequently diluted with 76.6 g of perchloroethylene and a 50% clear resin solution is obtained.

Acid number: 33.4

90 g of this resin solution are emulsified together with 7.2 g of a 70% solution of hexamethylolmelamine dibutyl and tributyl ether in butanol and 20 g of a 50% aqueous solution of an adduct of hydroabietyl alcohol and 200 moles of ethylene oxide which has been crosslinked with 1% of hexamethylene-1,6-diisocyanate, with the addition of 49.3 g of deionised water. A finely disperse emulsion is obtained.

Resin content: 30%, pH: 4.3.

EXAMPLE 4

98.5 g (0.1 epoxide group equivalent) of an epoxide according to Example 1, 10.8 g (0.04 amino group equivalent) of stearylamine and 50 g of butyl glcyol are stirred for 2 hours at 100° C internal temperature. Then 17 g (0.05 acid equivalent) of the product described in Manufacturing Direction D are added and stirring is continued for 3 hours at 100° C internal temperature. Then 2.2 g (0.04 mole) of acrylonitrile are added and stirring is continued for 1 hour at 100° C internal temperature. The batch is subsequently diluted with 78.5 g of perchloroethylene and a 50% clear resin solution is obtained.

Acid number: 24.5

90 g of this resin solution are emulsified together with 7.2 g of a 70% solution of hexamethylolmelamine dibutyl and tributyl ether in butanol and 20 g of a 50% aqueous solution of an adduct of hydroabietyl alcohol and 200 moles of ethylene oxide which has been crosslinked with 1% of hexamethylene-1,6-diisocyanate, with the addition of 49.3 g of deionised water which contains 0.5 g of diammonium phosphate. A finely disperse emulsion is obtained.

Resin content: 30%, pH: 5.2.

EXAMPLE 5

98.5 g (0.1 epoxide group equivalent) of an epoxide according to Example 1, 10.8 g (0.04 amino group equivalent) of stearylamine and 50 g of butyl glycol are stirred for 2 hours at 100° C internal temperature. Then 44.5 g (0.05 acid equivalent) of the product described in Manufacturing Direction E are added and stirring is continued for 3 hours at 100° C internal temperature. Then 2.2 g (0.04 mole) of acrylonitrile are added and stirring is continued for 1 hour at 100° C internal temperature. The batch is subsequently diluted with 106 g of perchloroethylene and a 50% clear resin solution is obtained.

Acid number: 18.4

123 g of this resin solution are emulsified together with 55.2 g of a 70% solution of hexamethylolmelamine dibutyl and tributyl ether in butanol and 34 g of a 50% aqueous solution of an adduct of hydroabietyl alcohol and 200 moles of ethylene oxide which has been crosslinked with 1% of hexamethylene-1,6-diisocyanate, with the addition of 120.8 g of deionised water, A finely disperse emulsion is obtained.

Resin content: 30%, pH: 3.4.

EXAMPLE 6

98.5 g (0.1 epoxide group equivalent) of an epoxide according to Example 1, 10.8 g (0.04 amino group equivalent) of stearylamine and 50 g of butyl glycol are stirred for 2 hours at 100° C internal temperature. Then 13.9 g (0.05 acid equivalent) of the product described in Manufacturing Direction F are added and stirring is continued for 3 hours at 100° C internal temperature. Then 2.2 g (0.04 mole) of acrylonitrile are added and stirring is continued for 1 hour at 100° C internal temperature. The batch is subsequently diluted with 75.4 g of perchloroethylene and a 50% clear resin solution is obtained.

Acid number: 21.5

90 g of this resin solution are emulsified together with 7.2 g of a 70% solution are emulsified together with 7.2 g of a 70% solution of hexamethylolmelamine dibutyl and tributyl ether in butanol and 20 g of a 50% aqueous solution of an adduct of hydroabietyl alcohol and 200 moles of ethylene oxide which has been crosslinked with 1% of hexamethylene-1,6-diisocyanate, with the addition of 49.3 g of deionised water. A finely disperse emulsion is obtained.

Resin content: 30%, pH: 4.9.

EXAMPLE 7

98.5 g (0.1 epoxide group equivalent) of an epoxide according to Example 1, 10.8 g (0.04 amino group equivalent) of stearylamine and 50 g of butyl glycol are stirred for 2 hours at 100° C internal temperature. Then 15.35 g (0.05 acid equivalent) of the product described in Manufacturing Direction G are added and stirring is continued for 3 hours at 100° C internal temperature. Then 2.2 g (0.04 mole) of acrylonitrile are added and stirring is continued for 1 hour at 100° C internal temperature. The batch is subsequently diluted with 76.85 g of perchloroethylene and a 50% clear resin solution is obtained.

Acid number: 17.2

90 g of this resin solution are emulsified together with 7.2 g of a 70% solution of hexamethylolmelamine dibutyl and tributyl ether in butanol and 20 g of a 50% aqueous solution of an adduct of hydroabietyl alcohol and 200 moles of ethylene oxide which has been crosslinked with 1% of hexamethylene-1,6-diisocyanate, with the addition of 49,3 g of deionised water which contains 0.5 g of diammonium phosphate. A finely disperse emulsion is obtained.

Resin content: 30%, pH: 5.1.

EXAMPLE 8

98.5 g (0.1 epoxide group equivalent) of an epoxide according to Example 1, 10.8 g (0.04 amino group equivalent) of stearylamine and 50 g of butyl glycol are stirred for 2 hours at 100° C internal temperature. Then 12.7 g (0.05 acid equivalent) of the product described in Manufacturing Direction H are added and stirring is continued for 2 hours at 100° C internal temperature. The batch is subsequently diluted with 72 g of perchloroethylene and a 50% clear resin solution is obtained.

Acid number: 17.8

90 g of this resin solution are emulsified together with 7.2 g of a 70% solution of hexamethylolmelamine dibutyl and tributyl ether in butanol and 20 g of a 50% aqueous solution of an adduct of hydroabietyl alcohol and 200 moles of ethylene oxide which has been crosslinked with 1% of hexamethylene-1,6-diisocyanate, with the addition of 49.3 g of deionised water. A finely disperse emulsion is obtained.

Resin content: 30%, pH: 4.3.

EXAMPLE 9

98.5 g (0.1 epoxide group equivalent) of an epoxide according to Example 1, 10.8 g (0.04 amino group equivalent) of stearylamine and 50 g of butyl glycol are stirred for 2 hours at 100° C internal temperature. Then 53 g (0.05 acid equivalent) of the product described in Manufacturing Direction I are added and stirring is continued for 3 hours at 100° C internal temperature. Then 2.2 g (0.04 mole) of acrylonitrile are added and stirring is continued for 1 hour at 100° C internal temperature. The batch is subsequently diluted with 114.5 g of perchloroethylene and a 50% clear resin solution is obtained.

Acid number: 13.2

90 g of this resin solution are emulsified together with 7.2 g of a 70% solution of hexamethylolmelamine dibutyl and tributyl ether in butanol and 20 g of a 50% aqueous solution of an adduct of hydroabietyl alcohol and 200 moles of ethylene oxide which has been crosslinked with 1% of hexamethylene-1,5-diisocyanate, with the addition of 49.3 g of deionised water. A finely disperse emulsion is obtained.

Resin content: 30%, pH: 4.3.

EXAMPLE 10

98.5 g (0.1 epoxide group equivalent) of an epoxide according to Example 1, 10.8 g (0.04 amino group equivalent) of stearylamine and 50 g of butyl glycol are stirred for 2 hours at 100° C internal temperature. Then 53.4 g (0.05 acid equivalent) of the product described in Manufacturing Direction K are added and stirring is continued for 3 hours at 100° C internal temperature. Then 2.2 g (0.04 mole) of acrylonitrile are added and stirring is continued for 1 hour at 100° C internal temperature. The batch is subsequently diluted with 114.9 g of perchloroethylene and a 50% clear resin solution is obtained.

Acid number: 15

90 g of this resin solution are emulsified together with 7.2 g of a 70% solution of hexamethylolmelamine dibutyl and tributyl ether in butanol and 20 g of a 50% aqueous solution of an adduct of hydroabietyl alcohol and 200 moles of ethylene oxide which has been crosslinked with 1% of hexamethylene-1,6-diisocyanate, with the addition of 49.3 g of deionised water. A finely disperse emulsion is obtained.

Resin content: 30%, pH: 3.6.

EXAMPLE 11

98.5 g (0.1 epoxide group equivalent) of an epoxide according to Example 1, 10.8 g (0.04 amino group equivalent) of stearylamine and 50 g of butyl glycol are stirred for 2 hours at 100° C internal temperature. Then 9.12 g (0.04) acid equivalent) of the product described in Manufacturing Direction A and 11.1 g (0.04 acid equivalent) of a mixture of approximately 91% trimerised $C_{54}$ acid and 5% of dimerised $C_{36}$ acid (derived from linoleic and linolenic acid) are added and stirring is continued for 3 hours at 100° C internal temperature. Then 2.2 g (0.04 mole) of acrylonitrile are added and stirring is continued for 1 hour at 100° C internal temperature. The batch is subsequently diluted with 81,72 g of perchloroethylene and a 50% clear resin solution is obtained.

Acid number: 18.7.

90 g of this resin solution are emulsified together with 7.2 g of a 70% solution of hexamethylolmelamine dibutyl and tributyl ether in butanol and 40 g of a 50% aqueous solution of an adduct of hydroabietyl alcohol and 200 moles of ethylene oxide which has been crossliked with 1% of hexamethylene-1,6-diisocyanate, with the addition of 49.3 g of deionised water. A finely disperse emulsion is obtained.

Resin content: 30%, pH: 3.9.

EXAMPLE 12

92.4 g (0.2 epoxide equivalent) of an epoxide according to Example 1, 21.6 g (0.08 amino group equivalent) of stearylamine and 45 g of butyl glycol are stirred together for 1 hour at 100° C internal temperature. Then 21.8 g (0.1 acid equivalent) of the product described in Manufacturing Direction N are added and stirring is continued for 3 hours at 100° C internal temperature. Then 10.25 g (0.08 mole) of n-butyl acrylate are added and stirring is continued for a further hour at 100° C internal temperature. The reaction product is subsequently diluted with 101 g of perchloroethylene and a 50% clear resin solution is obtained.

Acid number: 27.6.

210 g of this resin solution are emulsified together with 16.8 g of a 70% solution of hexamethylolmelamine dibutyl and tributyl ether in butanol and 40 g of a 50% aqueous solution of an adduct of hydroabietyl alcohol and 200 moles of ethylene oxide which has been crosslinked with 1% of hexamethylene-1,6-diisocyanate, with the addition of 122.2 g of deionised water. A finely disperse emulsion is obtained.

Resin content: 30%, pH: 4.2.

EXAMPLE 13

98.5 g (0.1 epoxide group equivalent) of an epoxide according to Example 1, 10.8 g (0.04 amino group equivalent) of stearylamine and 40 g of butyl glycol are stirred together for 1 hour at 100° C internal temperature. Then 15.3 g (0.05 acid equivalent) of the product described in Manufacturing Direction M are added and stirring is continued for 2 hours at 100° C internal temperature. Then 2.9 g (0.04 mole) of acrylic acid are added and stirring is continued once more for 1 hour at 100° C internal temperature. The reaction mixture is subsequently diluted with 87.5 g of perchloroethylene and a 50% clear resin solution is obtained.

Acid number: 20.4.

210 g of this resin solution are emulsified together with 16.8 g of a 70% solution of hexamethylolmelamine dibutyl and tributyl ether in butanol and 40 g of a 50% aqueous solution of an adduct of hydroabietyl alcohol and 200 moles of ethylene oxide which has been crosslinked with 1% of hexamethylene-1,6-diisocyanate, with the addition of 122.2 g of deionised water. A finely disperse emulsion is obtained.

Resin content: 30%, pH: 6.0.

EXAMPLE 14

98.5 g (0.1 epoxide equivalent) of an epoxide according to Example 1, 12.4 g (0.04 amino group equivalent) of a mixture of 1-amino-eicosane and 1-aminodocosane and 40 g of butyl glycol are stirred for 1 hour at 100° C internal temperature. Then 10.9 g (0.05 acid equivalent) of the product described in Manufacturing Direction N are added and stirring is continued for 3 hours at 100° C internal temperature. The reaction product is subsequently diluted with 81.8 g of perchloroethylene and a 50% clear resin solution is obtained.

Acid number: 17.7

210 g of this resin solution are emulsified together with 16.8 g of a 70% solution of hexamethylolmelamine dibutyl and tributyl ether in butanol and 40 g of a 50% aqueous solution of an adduct of hydroabietyl alcohol and 200 moles of ethylene oxide which has been crosslinked with 1% of hexamethylene-1,6-diioscyanate, with the addition of 122.2 g of deionised water. A finely disperse emulsion is obtained.

Resin content: 30%, pH: 4.2.

EXAMPLE 15

98.5 g (0.1 epoxide group equivalent) of an epoxide according to Example 1, 5.55 g (0.03 amino group equivalent) of dodecycloamine and 39 g of butyl glycol are stirred together for 1 hours at 100° C. Then 12.75 g (0.05 acid equivalent) of the product described in Manufacturing Direction L are added and stirring is continued for 2 hours at 100° C internal temperature. Then 1.6 g (0.03 mole) of acrylonitrile are added and stirring is continued once more for 1 hour at 100° C. The reaction mixture is subsequently diluted with 79.4 g of perchloroethylene and a 50% clear resin solution is obtained.

Acid number: 18.8.

210 g of this resin solution are emulsified together with 16.8 g of a 70% solution of hexamethylolmelamine dibutyl-and tributyl ether in butanol and 40g of a 50% aqueous solution of an adduct of hydroabietyl alcohol and 200 moles of ethylene oxide which has been cross-linked with 1% of hexamethylene-1,6-diisocyanate, with the addition of 122.2 g of deionised water. A finely disperse emulsion is obtained.

Resin content: 30%, pH: 4.1.

EXAMPLE 16

98.5 g (0.1 epoxide group equivalent) of an epoxide according to Example 1, 10.8 g (0.04 amino group equivalent) of stearylamine and 43 g of butyl glycol are stirred for 1 hour at 100° C internal temperature. Then 11.4 g (0.1 acid equivalent) of the product described in Manufacturing Direction A are added and stirring is continued for 2 hours at 100° C internal temperature. Then 1.85 g (0.02 mole) of epichlorohydrin are added and stirring is continued once more for 1 hour at 100° C. The reaction mixture is subsequently diluted with 79.5 g of perchloroethylene and a 50% clear resin solution is obtained.

Acid number: 19.

123 g of this resin solution are emulsified together with 7.2 g of a 70% solution of hexamethylolmelamine dibutyl and tributyl ether in butanol and 34 g of a 50% aqueous solution of an adduct of hydroabietyl alcohol and 200 moles of ethylene oxide which has been cross-linked with 1% of hexametylene-1,6-diisocyanate, with the addition of 120.5 g of deionised water. A finely disperse emulsion is obtained.

Resin content: 30%, pH: 4.6.

EXAMPLE 17

Dressing on dyed or undyed leather.
300 parts of the emulsion obtained in Example 10
100 parts of 10% phosphoric acid solution
570 parts of water
200 parts of ferric oxide dispersion (40% pigment content)

are mixed. The pigmented finishing solution is sprayed 3 times crosswise on the leather, which is dried after each application for 2 minutes at 60° C. The leather is then sprayed once crosswise with a colourless finishing solution consisting of 300 parts of the emulsion obtained in Example 10
100 parts of a 10% phosphoric acid solution in
600 parts of water, dried for 15 minutes at 60° C and ironed at 60° C and 50 bar. The finished leather is characterised by good gloss, a soft handle and very good dry and wet fastness properties and very good crease resistance. It has good fastness to ironing at temperatures up to 150° C.

Equal amounts of the emulsions described in Examples 1 to 9 and 11 can be used instead of the emulsion of Example 10.

Test Methods a) fastness to dry rubbing: the finished leather is rubbed 150 times in two directions with a piece of dry wool felt under pressure (1 bar overpressure/cm$^2$).

b) fastness to wet rubbing: the finished leather is rubbed 150 times in two directions with a piece of moist wool felt under pressure (1 bar overpressure/cm$^2$).

c) crease resistance: in this test the finished leather is creased 50,000 times and inspected to determine whether and/or to what extent the finish (outermost coating) is damaged where the leather has been creased.

d) resistance to ironing: the finished leather is ironed at 150° C and inspected to determine whether and/or to what extent the finish melts.

The results of tests (a) to (d) are evaluated using a rating from 1 to 5, with 5 being the highest rating.

Results

| emulsion of | fastness to dry rubbing | fastness to wet rubbing | crease resistance | fastness to ironing |
|---|---|---|---|---|
| Ex. 10 | 4 – 5 | 4 – 5 | 5 | 5 |
| 11 | 5 | 5 | 5 | 5 |

EXAMPLE 18

Synthetic polyamide fabric (nylon 66) is coated at room temperature on a conventional textile coating machine, for example by the floating blade method, with an emulsion consisting of 1000 parts of the emulsion obtained in Example 1a
10 parts of polyacrylic acid (thickener)
30 parts of ammonia (30%)
300 parts of a mixture of high-boiling aliphatic hydrocarbons (white spirit)

and subsequently dried for 2 minutes at 100° C or for 15 seconds at 180° C and cured. The amount of reaction product of Example 1 present on the fabric is approximately 15 g/m$^2$ or 15 percent by weight, referred to the weight of the fabric. The finished fabric has good impermeability with at the same time improved tear and abrasion resistance.

Instead of using the emulsion of Example 1a it is also possible to use the emulsions of Examples 2 to 11 to obtain equally good results.

Water can also be used to dilute the coating pastes instead of the above organic solvents. In this case, a cellulose ether or ethylene oxide adducts of high molecular weight must be used instead of the polyacrylic acid to adjust the desired viscosity.

EXAMPLE 19

A cotton fabric (150 – 180 g/m$^2$) is padded at room temperature with an aqueous liquor which contains 40 g/l of dimethyloldihydroxyethylene urea resin,
12 g/l of MgCl$_2$.6H$_2$O and
30 g/l of the emulsion obtained in Example 1a, and sequeezed out to a 70% pick-up. The fabric is subsequently dried at 100° C and cured for 30 seconds at 180° C or for 5 minutes at 150° C.

The mechanical properties, such as fastness to rubbing and abrasion resistance, are improved by using the reaction products in the resin finishing (crease-resistant finish) of cellulosic fibrous materials. In addition, the finished cotton fabric has a markedly reduced tendency to soil. The emulsion obtained in Example 2 to 11 can also be used with equally good results instead of the emulsion of Example 1a.

EXAMPLE 20

A cotton fabric (150 – 180 g/m²) is padded at room temperature with a liquor which contains 3 g/l of C.I. Pigment Orange 34
40 g/l of dimethyloldihydroxyethylene urea resin
15 g/l of $MgCl_2.6H_2O$
50 g/l of the emulsion obtained in Example 1a and squeezed out to a pick-up of 70%. The fabric is subsequently dried at 100° C and cured for 4 minutes at 160° C (or for 5 minutes at 150° C or for 30 seconds at 180° C). Further ingredients, such as fabric softeners (silicone oil emulsions, polyethylene emulsions), can also be added to the impregnating bath. The coloured fabric has good fastness properties, in particular fastness to washing, water and dry cleaning.

White pigments can be used as delusterants instead of the organic pigment dyestuff used in the recipe, in which case the aminoplast resin may be omitted.

The emulsion obtained in Examples 2 to 11 can also be used in pigment dyestuff preparations instead of the emulsion of Example 1a and equally good results are obtained.

EXAMPLE 21

A cotton poplin fabric is padded at room temperature with an aqueous liquor which contains 3 g/l of Pigment Blue 15.3 (C.I. No. 74160)
80 g/l of binder emulsion
60 g/l of an etherified methylolmelamine resin
30 g/l of an oxethylated fatty alcohol (40% emulsion)
15 g/l of an aqueous polyethylene emulsion
10 g/l of an aqueous silicone emulsion (40%)
15 g/l of magnesium chloride hexahydrate, and squeezed out to a pick-up of 62%. The fabric is then dried for 30 seconds and cured for 5 minutes at 150° C.

The dyed fabric is subjected to the following tests and exhibits good fastness properties therein:

a. Washfastness: washed 3 times at 95° C with a liquor which contains 5 g/l of soap and 2 g/l of sodium carbonate.

b. Fastness to dry cleaning: dry cleaned 5 times (perchloroethylene liquor).

Tests (a) and (b) are carried out using the Grey Scale.
Rating 1: pronounced loss of colour compared with the original.
Rating 5: no loss of colour compared with the original.

c. Fastness to rubbing (dry and wet): evaluation using the rating from 1 to 5, with 5 being the highest rating.

| Test | | | c | |
|---|---|---|---|---|
| Emulsion | a | b | dry | wet |
| Example 1a | 3 | 4 | 4 | 4 |
| 12 | 4 – 5 | 3 – 4 | 4 | 3 – 4 |
| 13 | 4 – 5 | 3 | 4 | 3 – 4 |
| 14 | 4 | 3 – 4 | 4 | 3 – 4 |
| 15 | 4 – 5 | 3 | 4 | 3 – 4 |

I claim:

1. Preparations of reaction products obtained from epoxides, fatty amines and reaction products which contain carboxyl groups, said preparations being in the form of solutions in organic solvents, or aqueous dispersions or emulsions, and containing
   1. reaction products of
      a. an epoxide which contains in each molecule at least two epoxide groups and which is a polyglycidyl ether of 2,2-bis-(4'-hydroxyphenyl)-propane,
      b. a fatty amine containing 12 to 24 carbon atoms,
      c. a reaction product which contains carboxyl groups and is obtained from
         $c_1$. a trihydric to hexahydric aliphatic alcohol,
         $c_2$. 1,2-propylene oxide, and
         $c_3$. an aliphatic saturated dicarboxylic acid of 2 to 14 carbon atoms, an ethylenically unsaturated aliphatic dicarboxylic acid of 4 to 10 carbon atoms, a monocyclic or bicyclic aromatic dicarboxylic acid of 8 to 12 carbon atoms; or anhydrides thereof,
         and wherein the mole ratio of $(c_1)$, $(c_2)$ and $(c_3)$ in (c) in 1:2 to 110:2 to 6; and optionally,
      d. an epihalohydrin, glycerol dichlorohydrin, acrylic acid, methylolacrylic acid, butylacrylate or acrylonitrile;
      wherein the reaction products (1) contain, per epoxide group equivalent of component (a), 0.1 to 0.7 amino group equivalent of component (b), 0.2 to 1.5 acid equivalents of component (c), and optionally 0.1 to 0.7 moles of component (d); and
   2. an alkyl ether of a methylolaminotriazine aminoplast precondensate, and wherein said preparations contain 5 to 70 percent by weight of component (2), relative to reaction products (1), and wherein (1) and (2) are present as a mixture, reaction product of (1) and (2), or both.

2. Preparations according to claim 1, wherein a monofatty amine containing 16 to 22 carbon atoms is used as component (b).

3. Preparations according to claim 1, wherein a trihydric to hexahydric alcohol which contains 3 to 6 carbon atoms is used as component $(c_1)$.

4. Preparations according to claim 3, wherein glycerol, pentaerythritol, sorbitol, trimethylolethane or trimethylolpropane is used as component $(c_1)$.

5. Preparations according to claim 4, wherein component (a) has an epoxide content of 1 to 6 epoxide group equivalents per kilogram.

6. Preparations according to claim 4, wherein a reaction product of epichlorohydrin and 2,2-bis-(4'-hydroxyphenyl)-propane is used as component (a).

7. Preparations according to claim 1, wherein an aliphatic saturated dicarboxylic acid containing 2 to 14 carbon atoms, or the anhydride thereof, is used as component $(c_3)$.

8. Preparations according to claim 7, wherein a dicarboxylic acid of the formula

$$HOOC-(CH_2)_{y-1}COOH$$

wherein y is an integer from 1 to 13, is used as component $(c_3)$.

9. Preparations according to claim 8, wherein a dicarboxylic acid of the formula

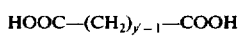

$$HOOC-(CH_2)_{y'-1}-COOH$$

in which $y'$ is an integer from 3 to 9, is used as component $(c_3)$.

10. Preparations according to claim 1, wherein the anhydride of an ethylenically unsaturated dicarboxylic acid containing 4 to 10 carbon atoms is used as component $(c_3)$.

11. Preparations according to claim 10, wherein maleic anhydride is used as component (c₃).

12. Preparations according to claim 1, wherein monocyclic or bicyclic aromatic dicarboxylic acids containing 8 to 12 carbon atoms, or the anhydrides thereof, are used as component (c₃).

13. Preparations according to claim 12, wherein an anhydride of a monocyclic aromatic dicarboxylic acid containing 8 to 10 carbon atoms is used as component (c3).

14. Preparations according to claim 13, wherein an unsubstituted or a methyl-substituted phthalic anhydride is used as component (c₃).

15. Preparations according to claim 1, wherein an epihalohydrin is used as component (d).

16. Preparations according to claim 1 wherein acrylonitrile is used as component (d).

17. Preparations according to claim 1 wherein an alkyl ether of a highly methylolated melamine whose alkyl moieties contain 1 to 6 carbon atoms, is used as component (2).

18. Preparations according to claim 17, wherein n-butyl ethers of a highly methylolated melamine which contain 2 to 3 n-butyl radicals in the molecule are used as component (2).

19. Preparation according to claim 1 wherein component (c) is a reaction product obtained from 1 mole of component (c₁), 2 to 110 moles of component (c₂) and 3 to 5, moles of component (c₃).

20. Preparations according to claim 1 which contain mixtures of (1) and (2) in the weight ratio of (90 to 40) : (10 to 60).

21. A process for coating textile material, wherein the fibrous material is treated at 20° to 100° C with the aqueous emulsions according to claim 1.

22. A process for dressing leather, wherein the leather is treated at 20° to 100° C with the aqueous emulsions according to claim 1.

23. The material treated by the process of claim 22.

24. Reaction products of epoxides, fatty amines and reaction products which contain carboxyl groups, which are
1. reaction products of
    a. an epoxide which contains in each molecule at least two epoxide groups and which is a polyglycidyl ether of 2,2-bis-(4'-hydroxyphenyl)-propane,
    b. a fatty amine containing 12 to 24 carbon atoms,
    c. a reaction product which contains carboxyl groups and is obtained from
        c₁. a trihydric to hexahydric aliphatic alochol,
        c₂. 1,2-propylene oxide, and
        c₃. an aliphatic saturated dicarboxylic acid of 2 to 14 carbon atoms, an ethylenically unsaturated aliphatic dicarboxylic acid of 4 to 10 carbon atoms, a monocyclic or bicyclic aromatic dicarboxylic acid of 8 to 12 carbon atoms; or anhydrides thereof,
    and wherein the mole ration of (c₁), (c₂) and (c₃) in (c) is 1:2 to 110:2 to 6; and optionally,
    d. an epihalohydrin, glycerol dichlorohyrin, acrylic acid, methylolacrylic acid, butylacrylate or acrylonitrile;
    wherein the reaction products (1) contain, per epoxide group equivalent of component (a), 0.1 to 0.7 amino group equivalent of component (b), 0.2 to 1.5 acid equivalents of component (c), and optionally 0.1 to 0.7 moles of component (d); and
2. an alkyl ether of a methylolaminotriazine aminoplast precondensate, and wherein the reaction products contain 5 to 70 percent by weight of component (2), relative to reaction products (1), and wherein (1) and (2) are present as a mixture, reaction product of (1) and (2), or both.

25. A reaction product according to claim 24, wherein (1) and (2) are present as a reaction mixture of (1) and (2).

26. A reaction product according to claim 25, wherein component (d) is present in (1).

27. A process for the manufacture of reaction products of epoxides, fatty amines and reaction products which contain carboxyl groups, wherein
1. the ingredients
    a. an epoxide which contains in each molecule at least two epoxide groups and which is a polyglycidyl ether of 2,2-bis-(4'-hydroxyphenyl)-propane,
    b. a fatty amine containing 12 to 24 carbon atoms,
    c. a reaction product which contains carboxyl groups and is obtained from
        c₁. a trihydric to hexahydric aliphatic alcohol,
        c₂. 1,2-propylene oxide, and
        c3. an aliphatic saturated dicarboxylic acid of 2 to 14 carbon atoms, an ethylenically unsaturated aliphatic dicarboxylic acid of 4 to 10 carbon atoms, a monocyclic or bicyclic aromatic dicarboxylic acid of 8 to 12 carbon atoms; or anhydrides thereof,
    and wherein the mole ratio of (c₁), (c₂) and (c₃) in (c) is 1:2 to 110:2 to 6; and optionally,
    d. an epihalohydrin, glycerol dichlorohydrin, acrylic acid, methylolacrylic acid, butylacrylate or acrylonitrile;
    wherein the ingredients (1) contain, per epoxide group equivalent of component (a), 0.1 to 0.7 amino group equivalent of component (b), 0.2 to 1.5 acid equivalents of component (c), and optionally 0.1 to 0.7 moles of component (d); and
2. an alkyl ether of a methylolaminotriazine aminoplast precondensate, and wherein the reaction products contain 5 to 70 percent by weight of component (2), relative to ingredients (1), are reacted in an organic solvent at temperatures of 80° to 120° C, or ingredients (1) alone are so reacted and the reaction product thereof mixed with component (2), or (1) and a portion of component (2) are so reacted and the reaction product thereof mixed with the remainder of component (2).

* * * * *